United States Patent [19]

Thomas et al.

[11] Patent Number: 5,413,444
[45] Date of Patent: May 9, 1995

[54] SELF-DRILLING FASTENER

[75] Inventors: Louis Thomas, Maywood; Daniel J. Kenny, Itasca; Syed Riaz-Ul Hasan; George G. Dewey, both of Palatine, all of Ill.

[73] Assignee: Illinois Tool Works Inc., Glenview, Ill.

[21] Appl. No.: 291,740

[22] Filed: Aug. 17, 1994

Related U.S. Application Data

[63] Continuation of Ser. No. 178,096, Jan. 6, 1994, abandoned.

[51] Int. Cl.⁶ ............................................. F16B 25/00
[52] U.S. Cl. ...................................... 411/387; 411/29
[58] Field of Search ...................... 411/29, 30, 31, 386, 411/387

[56] References Cited

U.S. PATENT DOCUMENTS

| 3,316,796 | 5/1967 | Young . | |
| 4,028,987 | 6/1977 | Wilson . | |
| 4,241,639 | 12/1980 | Baer | 411/387 |
| 4,480,951 | 11/1984 | Regensburger | 411/387 X |
| 4,601,625 | 7/1986 | Ernst et al. | 411/387 |
| 4,645,396 | 2/1987 | McCauley et al. | 411/387 |
| 4,693,654 | 9/1987 | Bettini | 411/387 |
| 4,793,756 | 12/1988 | Baumgartner | 411/387 |
| 4,900,208 | 2/1990 | Kaiser et al. | 411/387 |
| 5,015,134 | 5/1991 | Gotoh | 411/386 |
| 5,067,864 | 11/1991 | Dewey et al. | 411/344 |
| 5,267,423 | 12/1993 | Giannuzzi | 411/387 X |

FOREIGN PATENT DOCUMENTS 2642801 1/1989 France .

Primary Examiner—Neill R. Wilson
Attorney, Agent, or Firm—Mark Croll; Thomas Buckman; John O'Brien

[57] ABSTRACT

A self-drilling fastener for use with medium density wood panels, such as oriented strand board (OSB), having a head and first and second shank portions where the first shank portion includes threads for mating engagement with an OSB panel and the second shank portion substantially is formed as a taper shank flat drill which forms the drilling end of the fastener, the taper shank flat drill having conical shaped tapered portions, a triangular drill tip and a pair of wing portions formed on opposite sides of the flat drill forming helical cutting edges.

4 Claims, 2 Drawing Sheets

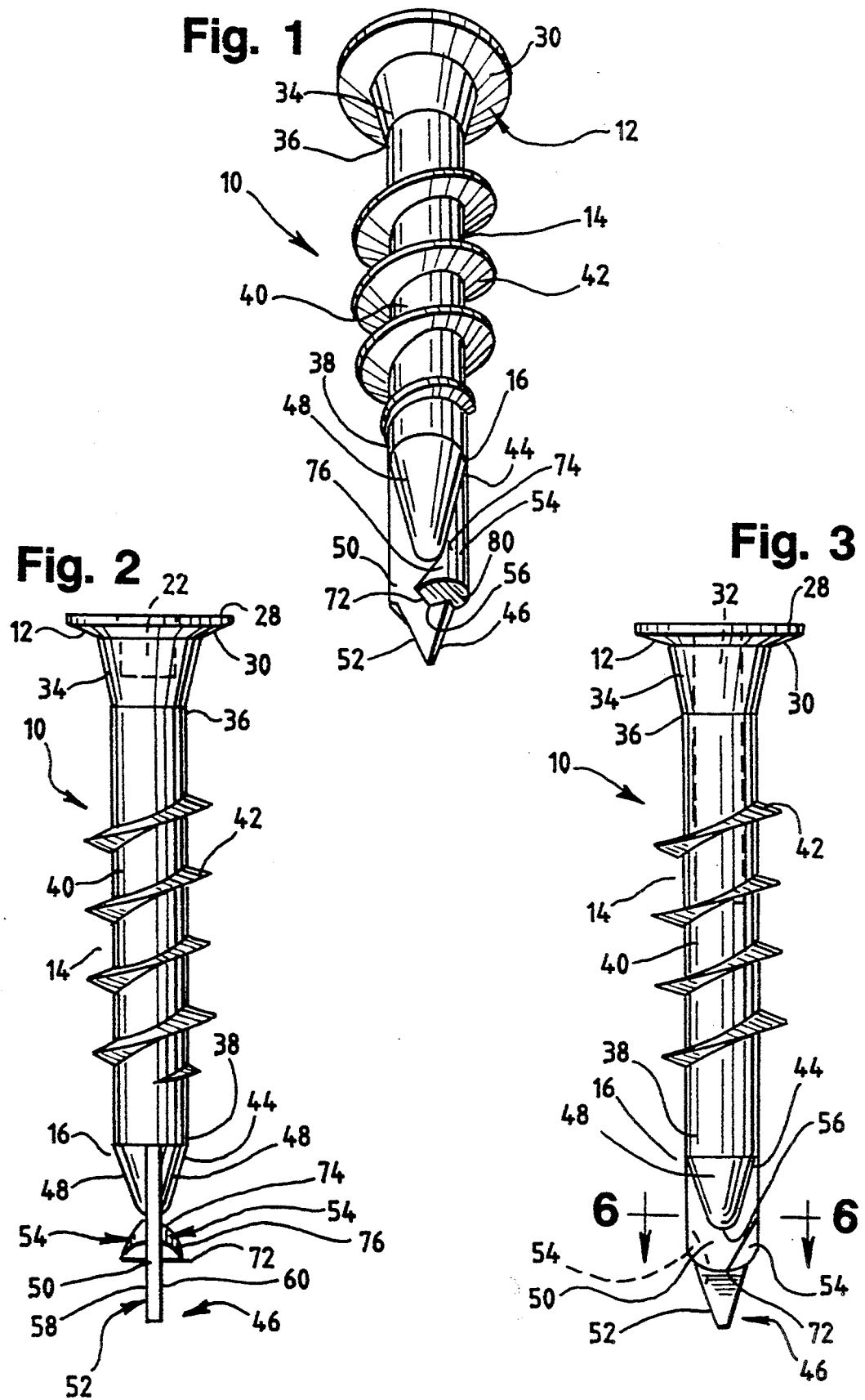

SELF-DRILLING FASTENER

This application is a continuation of application Ser. No. 08/178,096, filed Jan. 6, 1994, now abandoned.

BACKGROUND OF THE INVENTION

1. Field of the Invention

This invention relates generally to self-drilling fasteners, and more particularly to a self-drilling screw for use with wood panels, such as oriented strand board (OSB), which drills its own two-stage pilot hole to enable screw threads to engage a material with reduced torque and splitting of the material.

2. Description of the Related Art

Self-drilling fasteners typically are utilized to attach a first member to a second base member and include some type of drill tip and threads along the shank of the fastener. The drill tip drills through both members and provides a pilot hole for the threads in order to secure the fastener to the base material with less torque and splitting of the base material. The drill tip and threads typically are modified for use with different materials.

Examples of self-drilling fasteners are illustrated in U.S. Pat. Nos. 4,601,625 and 5,067,864 both of which are assigned to the assignee herein. Those fasteners provide self-drilling threaded inserts that are utilized for drilling into substantially soft base materials, such as drywall, and include drill tips having central spikes positioned between two peripheral spikes. The inserts also include some type of toggle portion which can deflect laterally upon insertion of a separate screw within the insert to enable attachment of an article thereto. The central spike of the drill tip serves as a locator to prevent the tip from moving during initial drilling while the peripheral spikes cut the paper surface of the drywall.

Although such a fastener is most effective when utilized with soft drywall, it cannot be utilized with harder materials such as wood. Various self-drilling fasteners have been developed for drilling into wood and relatively soft wood panels, such as plywood, as well as dense composition wood panels such as particle board. Particle board, however, is very heavy and both materials are relatively expensive which makes them undesirable in many construction applications.

Wood panels known as oriented strand board (OSB) or waferboard are increasingly being utilized in construction. OSB substantially is composed of wood chips, has a hardness between that of plywood and particle board, is substantially lighter than particle board and is strong enough for most construction applications. Additionally, the cost of OSB is significantly lower than plywood or particle board which contributes to its popularity.

Existing fasteners utilized for plywood and particle board do not perform well with OSB. Plywood fasteners have difficulty drilling into the denser OSB while particle board fasteners are too harsh for OSB and frequently cause splitting.

It therefore would be desirable to provide a self-drilling fastener particularly for use with a material of medium density, such as OSB or waferboard, which readily drills its own pilot hole and fastens itself to the OSB with reduced torque and splitting.

SUMMARY OF THE INVENTION

The invention provides a self-drilling fastener preferably for use with medium density wood panels, such as oriented strand board (OSB), and includes a head and first and second shank portions. The first shank portion includes threads for mating engagement with the OSB panels. The second shank portion substantially is formed as a taper flat drill with conical shaped tapered portions on opposite sides of the flat drill portion. The flat drill portion includes a triangular shaped drill tip and a pair of wing portions on opposite sides of the flat drill which form helical cutting edges.

In use, the drill tip provides an initial pilot hole in the OSB panel with the helical wing portions expanding that pilot hole to a predetermined diameter and funnelling wood chips away from the drill tip. The threads then can engage the OSB material with a minimum amount of torque without causing splitting of the OSB panel and provide substantial engagement therewith.

BRIEF DESCRIPTION OF THE DRAWINGS

FIG. 1 is a bottom perspective view of a self-drilling fastener of the invention for use with OSB;

FIG. 2 is a front elevational view of the fastener of the invention illustrating the wing portions of the drill portion;

FIG. 3 is a side elevational view of the fastener of FIG. 2;

DESCRIPTION OF THE PREFERRED EMBODIMENT

Figure 4:
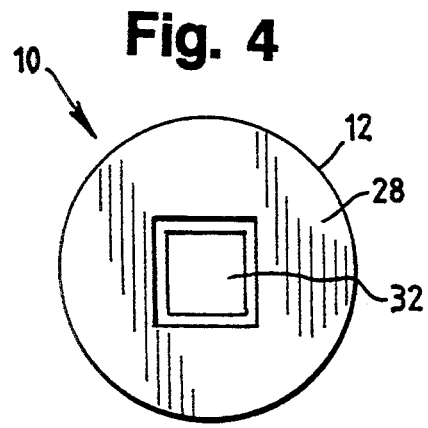
FIG. 4 is a top plan view of the fastener of FIGS. 1–3 illustrating one type of head configuration.

Referring to FIGS. 1–3, the self-drilling fastener of the invention is designated generally by the reference numeral 10. The fastener 10 substantially includes a head 12, a first shank portion 14 and a second shank portion 16.

Figure 8:
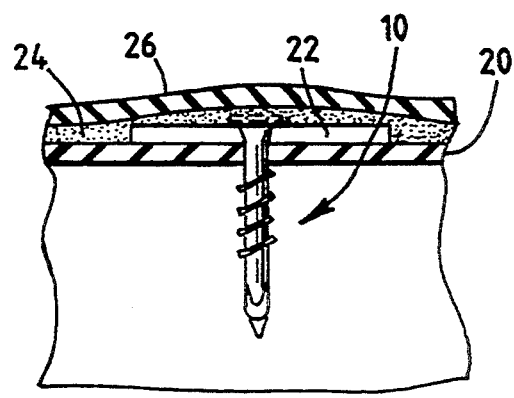
FIG. 8 is a side elevational view of the fastener of the invention illustrated in a roofing application.

As FIG. 8 illustrates, the fastener 10 preferably is utilized with a medium density wood panel 18 such as oriented strand board (OSB) or waferboard. In one particular application, the fastener 10 can be utilized in roof construction to drill through and secure a base sheet 20 to a wood panel 18 with a washer 22. Thereafter, a layer of tar or asphalt 24 can be applied over the base sheet 20, washer 22 and fastener 10 and finally covered with another sheet 26, such as a three-ply sheet or the like. It is to be understood, however, that the particular use of the fastener 10 can vary so long as it functions as described herein.

As FIGS. 2–4 illustrate, the head 12 includes a first engagement side 28 and a second underside 30. The engagement side 28 preferably includes a recess 32 for engagement with a corresponding drive tool (not illustrated.) Although the recess 32 is illustrated for use with a square drive tool and with different lengths in FIGS. 2 and 3, the particular shape and length of the recess 32 can vary to accommodate a slotted, phillips or any other type of drive tool of various lengths.

As FIGS. 1–3 illustrate, the underside 30 of the head 12 includes a tapered portion 34 which tapers inward to the center of the head 12. The tapered portion 34 enables the head 12 to be countersunk with respect to the washer 22 or any other desired material.

The first shank portion 14 includes first and second opposite ends 36 and 38 with a substantially circular elongate portion 40 extending therebetween. The first end 36 integrally is formed with the tapered portion 34.

To secure the fastener 10 to the panel 18, the elongate portion 40 includes a set of threads 42. The length of the elongate portion 40 between the threads 42 and the first end 36 can vary to accommodate materials thicker than the base sheet 20, such as an insulating panel or similar type of material.

The threads 42 cut a mating thread within the panel 18 and engage the fastener 10 therein. The threads 42 preferably are smaller in diameter toward the second end 38 of the first shank portion 14 to provide gradual engagement with the panel 18.

The second shank portion 16 substantially is formed as a taper shank flat drill having first and second opposite ends 44 and 46, tapered portions 48, a substantially planar drill portion 50, a triangular shaped drill tip 52 and a pair of helical cutting wings 54. The first end 44 integrally is formed with the second end 38 of the first shank portion 14 and the second opposite end 46 forms a distal end of the fastener 10.

As FIG. 2 illustrates, the tapered portions 48 are formed on opposite sides of the second shank portion 16 and provide a conical cross-sectional configuration to the second shank portion 16. As FIG. 3 illustrates, a base 56 of each tapered portion 48 is positioned proximate the midpoint of the planar drill portion 50.

The planar portion 50 is formed with a predetermined thickness and includes first and second opposite planar surfaces 58 and 60. Each surface 58 and 60 extends between a base of the triangular drill tip 52 and the tapered portions 48 and surrounds the tapered portions 48 to provide a transition between the first and second shank portions 14 and 16.

Figure 5:
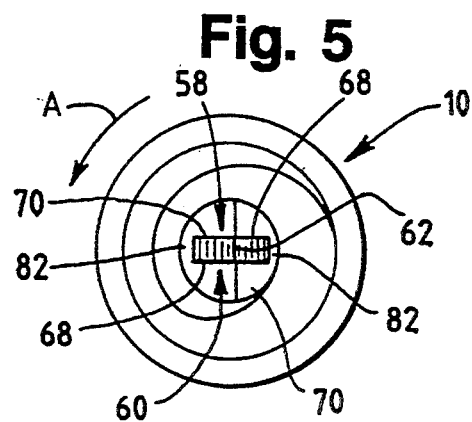
FIG. 5 is a bottom plan view of the fastener of FIGS. 1–3 illustrating the drill tip thereof.
Figure 6:
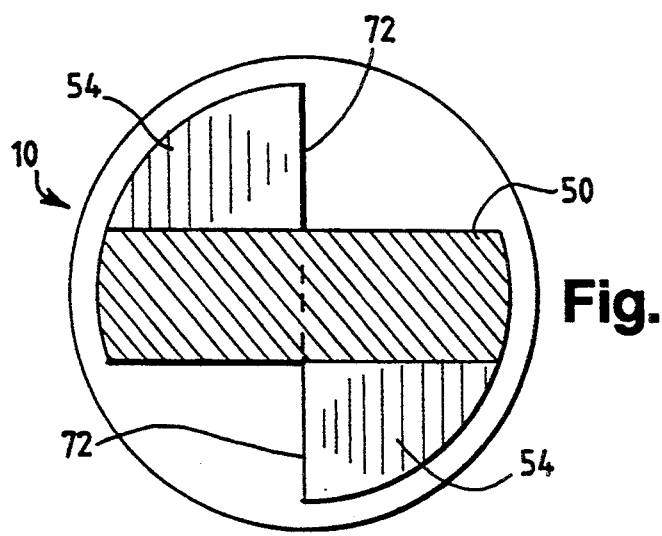
FIG. 6 is a lateral cross-sectional view of the fastener taken along line 6—6 of FIG. 3.
Figure 7:
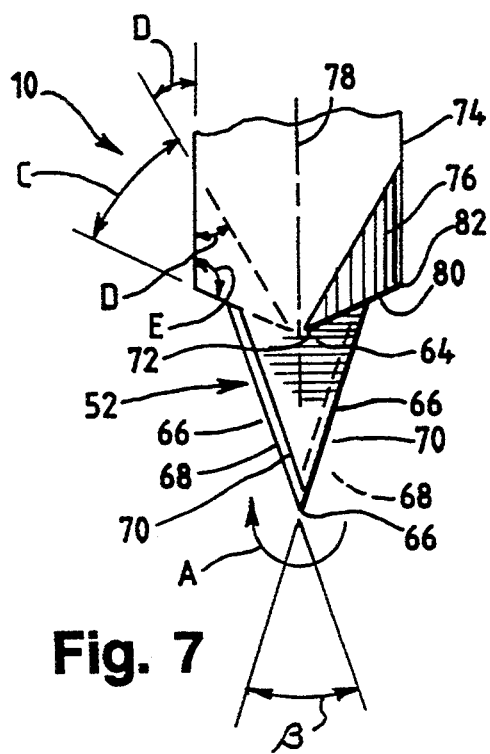
FIG. 7 is an enlarged side elevational view of the drill tip of FIG. 3.

As FIG. 7 illustrates, the drill tip 52 preferably is substantially triangular in shape having a tip 62, a base 64 and opposite sides 66 extending between the tip 62 and base 64. As FIG. 5 illustrates, the tip 62 extends across the width of the planar portion 50 at an angle which preferably is non-perpendicular and provides a cutting or chisel edge facing the direction of drilling indicated by arrow "A".

The sides 66 of the drill tip 52 are formed at an angle "B" with respect to each other which can vary between 30–40 degrees and preferably is 36 degrees. The sides 66 also are tapered from a leading edge 68 facing the direction of drilling to a trailing edge 70 to enable the desired cutting of the OSB panel.

The cutting wings 54 are formed one each on the first and second planar surfaces 58 and 60 of the planar portion 50. AS FIG. 1 illustrates, each wing 54 is formed as a helical cutting edge and includes a leading edge 72, a trailing edge 74 and a substantially triangular body portion 76 extending therebetween.

The leading edge 72 has a predetermined length selected to provide a transverse dimension to the second shank portion 16 which is greater than the transverse dimension of the drill tip 52 yet smaller than the transverse dimension of the first shank portion 14. As FIG. 5 illustrates, the leading edge 72 is positioned proximate a longitudinal center line 78 of the second shank portion 16. The leading edge 72 also is tapered to enable cutting and funnelling of the OSB material along the body portion 76 toward the trailing edge 74.

As FIG. 7 illustrates, the body portion 76 includes a face 80 which tapers away from the leading edge 72 to an outside edge 82. As FIG. 5 illustrates, the outside edge 82 extends across the width of the planar portion 50. The body portion 76 also is tapered in thickness, as FIG. 2 illustrates, from the leading edge 72 to the trailing edge 74.

As FIG. 7 illustrates, the body portion 76 appears triangular in shape with an angle "C" of approximately 35 degrees, an angle "D" of approximately 30 degrees which makes the final angle "E" approximately 115 degrees. All of these angles, however, can vary so long as the wing portions 54 function as described herein.

In use, a driving tool is engaged within the recess 32 of a fastener 10 and the drill tip 52 is brought into engagement with a panel 18, such as an OSB panel. Upon rotation of the fastener 10 by the drive tool, the chisel edge 62 and tapered sides 66 of the drill tip 52 begin drilling an initial pilot hole. As the fastener 10 advances within the panel, the pilot hole increases in diameter until the pilot hole achieves a diameter corresponding to that of the base 64 of the drill tip 52.

Upon further advancement of the fastener 10, the leading edge 72 of the wing portions 54 engage the panel 18 and enlarge the initial pilot hole until it achieves a diameter corresponding to the transverse dimension of the second shank portion 16 proximate the wing portions 84. While enlarging the initial pilot hole, the wing portions 84 funnel material away from the drill tip 52 toward the tapered portions 48 of the second shank portion 16. Further drilling causes the fastener 10 to advance into the panel 18 for the threads 42 to engage the panel 18 and maintain the fastener 10 therein.

Modifications and variations of the present invention are possible in light of the above teachings. It therefor is to be understood that within the scope of the appended claims the invention may be practiced other than specifically described.

What is claimed and desired to be secured by Letters Patent is:

We claim:

1. A self-drilling fastener, comprising:

a head integrally formed on a first end of said fastener;

a first shank portion integrally formed with a first side of said head and extending away from said head a predetermined distance, said first shank portion including a plurality of threads formed thereon for forming a mating thread in a desired material into which said fastener is driven for connecting said fastener thereto; and a second shank portion integrally formed with said first shank portion opposite said head and forming a second opposite end of said fastener, said second shank portion substantially being formed as a taper shank flat drill having a tapered portion connected to said first shank portion and a flat drill portion forming said second end, said tapered portion substantially being in the shape of a cone tapering toward said second end, said flat drill portion having a predetermined thickness with opposing planar surfaces and forming a substantially triangular shaped drill tip at said second end, each planar portion including a wing portion integrally formed therewith proximate a base of said triangular shaped drill tip, each wing portion defining a substantially helical cutting edge.

2. The fastener as defined in claim 1 wherein sides of said triangular shaped drill tip are tapered to provide cutting edges thereon.

3. The fastener as defined in claim 1 wherein said drill portion proximate said wing portions has a transverse dimension greater than a transverse dimension of said drill portion proximate said base of said triangular drill tip so that said fastener provides a two-stage pilot hole upon drilling.

4. The fastener as defined in claim 1 wherein said drill portion proximate said wing portions has a transverse dimension less than that of said first shank portion.

* * * * *